United States Patent
Hu et al.

(10) Patent No.: US 12,438,855 B2
(45) Date of Patent: Oct. 7, 2025

(54) METHOD, ELECTRONIC DEVICE, AND COMPUTER PROGRAM PRODUCT FOR ADDRESS ENCRYPTION

(71) Applicant: Dell Products L.P., Round Rock, TX (US)

(72) Inventors: Chenxi Hu, Beijing (CN); Sanping Li, Beijing (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 294 days.

(21) Appl. No.: 17/750,529

(22) Filed: May 23, 2022

(65) Prior Publication Data

US 2023/0344809 A1 Oct. 26, 2023

(30) Foreign Application Priority Data

Apr. 22, 2022 (CN) .......................... 202210436432.1

(51) Int. Cl.
*H04L 9/40* (2022.01)
*H04L 12/54* (2022.01)
*H04L 12/70* (2013.01)

(52) U.S. Cl.
CPC ...... *H04L 63/0435* (2013.01); *H04L 12/5601* (2013.01); *H04L 63/0236* (2013.01); *H04L 63/0876* (2013.01); *H04L 2012/5641* (2013.01)

(58) Field of Classification Search
None
See application file for complete search history.

(56) References Cited

U.S. PATENT DOCUMENTS

| | | | |
|---|---|---|---|
| 8,630,420 B2 * | 1/2014 | Galante | H04W 12/041 380/278 |
| 9,641,434 B1 * | 5/2017 | Laurence | H04L 45/7453 |
| 11,240,200 B1 * | 2/2022 | Vasquez | H04L 9/006 |
| 2002/0133607 A1 * | 9/2002 | Nikander | H04L 63/0442 709/229 |

(Continued)

OTHER PUBLICATIONS

Intel Corporation, "Intel Intelligent Fabric Processors," https://www.intel.com/content/www/us/en/products/network-io/programmable-ethernet-switch.html, Accessed Dec. 21, 2021, 6 pages.

*Primary Examiner* — Michael Pyzocha
(74) *Attorney, Agent, or Firm* — Ryan, Mason & Lewis, LLP

(57) ABSTRACT

Embodiments of the present disclosure provide a method, an electronic device, and a computer program product that involve address encryption. The method includes: in response to receiving a packet from a source device, extracting a first address representing an address of the source device from the packet. The method further includes: mixing the first address with a random number to generate a mixed address, wherein the number of bits of the first address is the same as the number of bits of the random number. The method further includes: encrypting the mixed address. Moreover, the method further includes: generating a second address representing the address of the source device at least partially based on the encrypted mixed address, wherein the second address includes a prefix field and an interface identifier field. Illustrative embodiments can improve the security of the source device, and reduce computational overhead during address encryption and decryption.

20 Claims, 6 Drawing Sheets

(56) References Cited

U.S. PATENT DOCUMENTS

| | | | |
|---|---|---|---|
| 2005/0027778 A1* | 2/2005 | Dimitrelis | H04L 61/5014 709/200 |
| 2005/0172333 A1* | 8/2005 | Kim | H04L 69/167 726/5 |
| 2006/0274643 A1* | 12/2006 | Choyi | H04L 63/1466 370/216 |
| 2008/0151897 A1* | 6/2008 | Nemoto | H04L 49/552 370/392 |
| 2009/0228708 A1* | 9/2009 | Trostle | H04L 69/16 713/168 |
| 2010/0153706 A1* | 6/2010 | Haddad | H04L 9/0662 713/153 |
| 2010/0211775 A1* | 8/2010 | Vogt | H04L 63/126 713/163 |
| 2011/0035585 A1* | 2/2011 | Haddad | H04W 12/02 713/168 |
| 2011/0283018 A1* | 11/2011 | Levine | H04L 61/4511 709/245 |
| 2012/0275240 A1* | 11/2012 | Choi | G11C 11/418 365/230.01 |
| 2013/0031605 A1* | 1/2013 | Huston, III | H04L 67/02 726/3 |
| 2013/0212249 A1* | 8/2013 | Groat | H04L 61/2525 709/223 |
| 2015/0081927 A1* | 3/2015 | Xu | H04L 61/5007 709/245 |
| 2017/0054679 A1* | 2/2017 | Choi | H04L 61/5007 |
| 2017/0155678 A1* | 6/2017 | Araújo | H04L 63/0236 |
| 2017/0272242 A1* | 9/2017 | Morrell | H04L 9/3242 |
| 2018/0097631 A1* | 4/2018 | Uppal | H04L 9/14 |
| 2019/0158453 A1* | 5/2019 | Ståhl | H04L 63/0245 |
| 2019/0260577 A1* | 8/2019 | Ren | H04L 9/0816 |
| 2019/0268309 A1* | 8/2019 | Govindarajan | H04L 63/168 |
| 2019/0361645 A1* | 11/2019 | Yoshimori | H04L 61/5076 |
| 2020/0314059 A1* | 10/2020 | Luo | H04L 61/5007 |
| 2020/0344164 A1* | 10/2020 | Zhang | H04L 67/1038 |
| 2022/0182354 A1* | 6/2022 | Fayed | H04L 61/5007 |
| 2024/0056318 A1* | 2/2024 | Yin | H04L 61/4511 |

\* cited by examiner

METHOD, ELECTRONIC DEVICE, AND COMPUTER PROGRAM PRODUCT FOR ADDRESS ENCRYPTION

RELATED APPLICATION(S)

The present application claims priority to Chinese Patent Application No. 202210436432.1, filed Apr. 22, 2022, and entitled "Method, Electronic Device, and Computer Program Product for Address Encryption," which is incorporated by reference herein in its entirety.

FIELD

Embodiments of the present disclosure relate to the field of computers, and more particularly, to a method, an electronic device, and a computer program product for address encryption.

BACKGROUND

With the development of network technologies, in order to ensure the security of communication, the IP address of a source device can be encrypted to prevent the IP address of the source device from being exposed to public servers, such as domain name system (DNS) servers, network time protocol (NTP) servers, and virtual private network (VPN) servers. Encryption and decryption algorithms need to consume computing resources, and can therefore impact performance of a server. Moreover, encrypting the address only in the server still has the risk of exposing the address of the source device.

SUMMARY

Embodiments of the present disclosure provide a method, an electronic device, and a computer program product for address encryption.

According to a first aspect of the present disclosure, a method for encrypting an address is provided. The method includes: in response to receiving a packet from a source device, extracting a first address representing an address of the source device from the packet. The method further includes: mixing the first address with a random number to generate a mixed address, wherein the number of bits of the first address is the same as the number of bits of the random number. The method further includes: encrypting the mixed address. Moreover, the method further includes: generating a second address representing the address of the source device at least partially based on the encrypted mixed address, wherein the second address includes a prefix field and an interface identifier field.

According to a second aspect of the present disclosure, an electronic device is also provided. The electronic device includes a processor and a memory coupled to the processor. The memory has instructions stored therein which, when executed by the processor, cause the device to perform actions. The actions include: in response to receiving a packet from a source device, extracting a first address representing an address of the source device from the packet. The actions further include: mixing the first address with a random number to generate a mixed address, wherein the number of bits of the first address is the same as the number of bits of the random number. The actions further include: encrypting the mixed address. Moreover, the actions further include: generating a second address representing the address of the source device at least partially based on the encrypted mixed address, wherein the second address includes a prefix field and an interface identifier field.

According to a third aspect of the present disclosure, a computer program product is provided. The computer program product is tangibly stored on a non-transitory computer-readable medium and includes machine-executable instructions, wherein the machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar drawing marks represent identical or similar elements, in which.

In all the accompanying drawings, identical or similar reference numerals indicate identical or similar elements.

DETAILED DESCRIPTION

Example embodiments of the present disclosure will be described in more detail below with reference to the accompanying drawings. Although the drawings show some embodiments of the present disclosure, it should be understood that the present disclosure can be implemented in various forms, and should not be interpreted as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid understanding, and are not intended to limit the scope.

The inventors have found that there are many risks in a network environment, in which behaviors such as stealing the address of a source device to conduct network attacks will cause significant losses. If the address of the source device is encrypted, the exposure of the source device to the network environment may be effectively avoided. Encrypting the address of a source device in a server (such as a DNS server) may still expose the address of the source device to an external network.

In order to solve the above shortcomings, embodiments of the present disclosure provide a solution for implementing address encryption and/or decryption at a switch. In this solution, the encryption/decryption process of the address of a source device is transferred to a switch for implementation. Therefore, the address encryption and decryption operations may be achieved using the computing power of the switch so as to protect the source device from network attacks.

Figure 1:
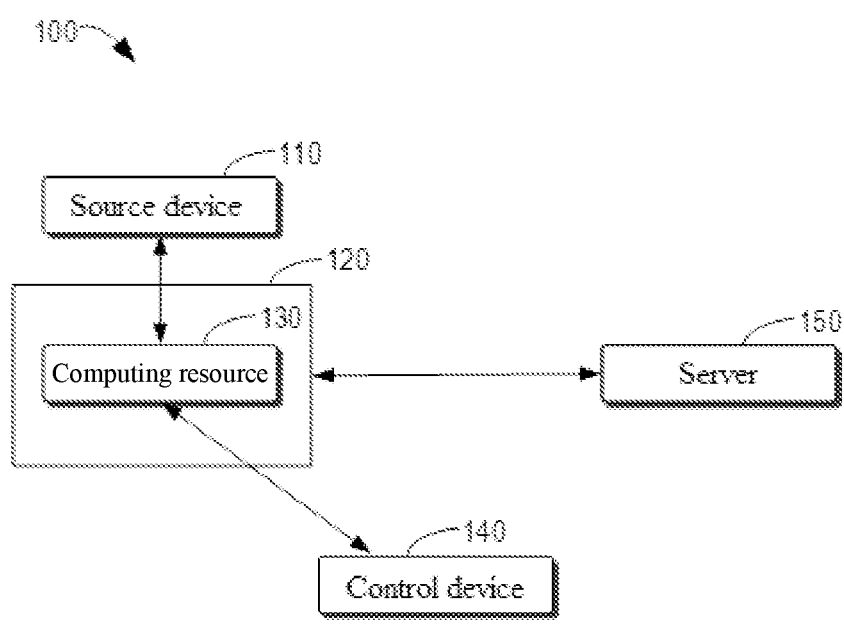
FIG. 1 illustrates a schematic diagram of an example environment in which embodiments of the present disclosure may be implemented.

FIG. 1 illustrates a schematic diagram of example environment 100 in which embodiments of the present disclosure may be implemented.

As shown in FIG. 1, example environment 100 may include source device 110. Source device 110 is usually a user client terminal with limited computing power and in need of privacy protection. As an example, the source device may be a personal computer, multiple computers within a local area network, etc.

In order to realize information exchange in the Internet, source device 110 is usually communicatively connected to switch 120. Switch 120 is usually arranged near source device 110 to provide a data exchange service for the corresponding source device. In order to undertake the computing tasks of encryption and decryption operations of the address of source device 110, computing resource 130 disposed in switch 120 may receive a packet from source device 110 and extract the IP address of the source device based on the encryption or decryption information about an encryption operation or a decryption operation received from control device 140, so as to encrypt or decrypt the IP address.

It should be understood that, as an example, the IP address to be encrypted may be divided into a plurality of blocks, and computing resource 130 may perform an encryption operation on these blocks. After the packet from source device 110 is encrypted, the encrypted packet may be sent to server 150 of an external network (such as the Internet). The server 150 may be part of or otherwise connected to the Internet. Therefore, communication from source device 110 to server 150 is realized, and during the communication process, the encryption and decryption operations of the address of the source device are all completed at the switch 120. The above process is reversible.

It should be understood that the architecture and functions of example environment 100 are described for illustrative purposes only, without implying any limitation to the scope of the present disclosure. Embodiments of the present disclosure may also be applied to other environments having different structures and/or functions.

A process according to an embodiment of the present disclosure will be described in detail below with reference to FIG. 2 to FIG. 4. For ease of understanding, the specific data mentioned in the following description are all illustrative and are not intended to limit the scope of protection of the present disclosure. It should be understood that the embodiment described below may also include additional actions not shown and/or may omit actions shown, and the scope of the present disclosure is not limited in this regard.

Figure 2:
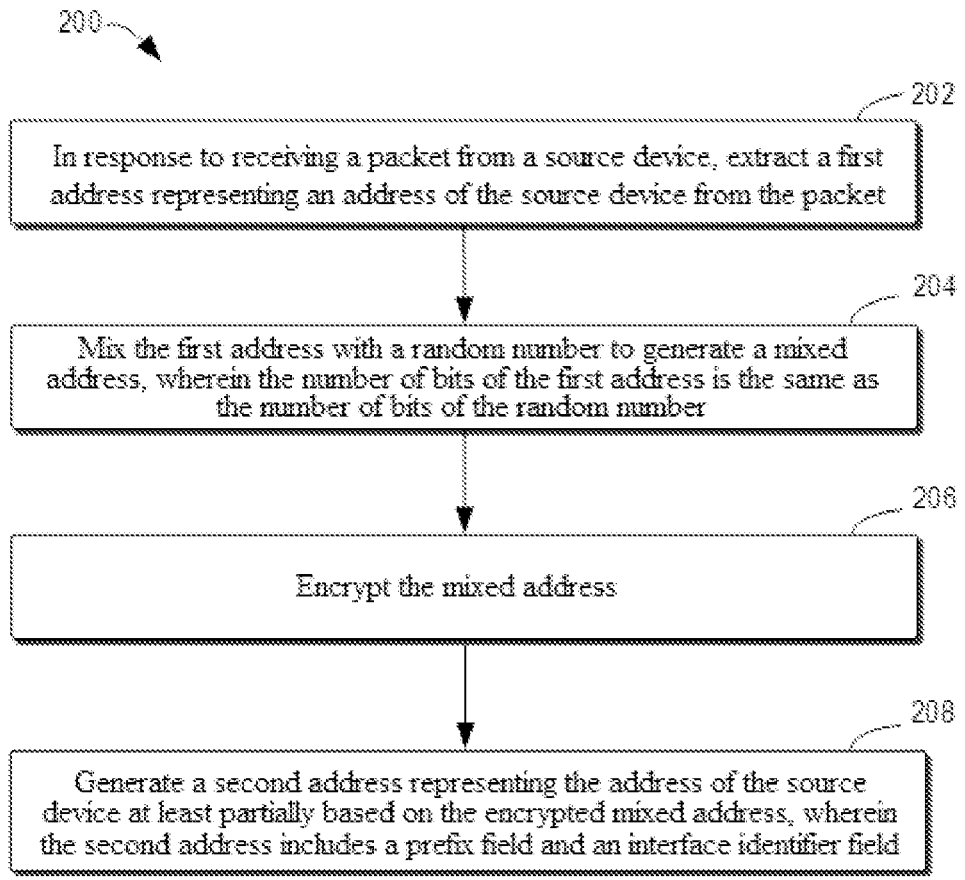
FIG. 2 schematically illustrates a flow chart of a method for encrypting an address according to an example implementation of the present disclosure.

FIG. 2 schematically illustrates a flow chart of a method 200 for encrypting an address according to an example implementation of the present disclosure.

At block 202, in response to receiving a packet from a source device, a first address representing an address of the source device is extracted from the packet. As an example, after the packet is received from source device 110, according to the structure of the packet, the IP address of source device 110 (such as 32-bit IPv4-based IP address) is determined from the corresponding field.

At block 204, the first address is mixed with a random number to generate a mixed address, wherein the number of bits of the first address is the same as the number of bits of the random number. The mixing may be performed in a common manner, which is not limited in the present disclosure.

At block 206, the mixed address is encrypted.

In some embodiments, encryption information about an encryption operation may be obtained from control device 140. The mixed address is divided into a plurality of blocks, such as 4 blocks called an S box and 1 block called a P box. Each of the plurality of blocks is encrypted based on the encryption information to determine corresponding encrypted blocks. The encryption information includes a key. As an example, the key may vary from 32 bits to 448 bits, which may be specifically determined by control device 140. Since the S box and the P box may be configured at the switch 120 and may be used as look-up tables, the computational overhead may be saved during encryption. Since the granularity of encryption is blocks, corresponding encrypted blocks may be combined to generate an encrypted mixed address. The specific encryption process will be described later with reference to FIG. 6.

At block 208, a second address representing the address of the source device is generated at least partially based on the encrypted mixed address, wherein the second address includes a prefix field and an interface identifier field.

Figures 3, 4:
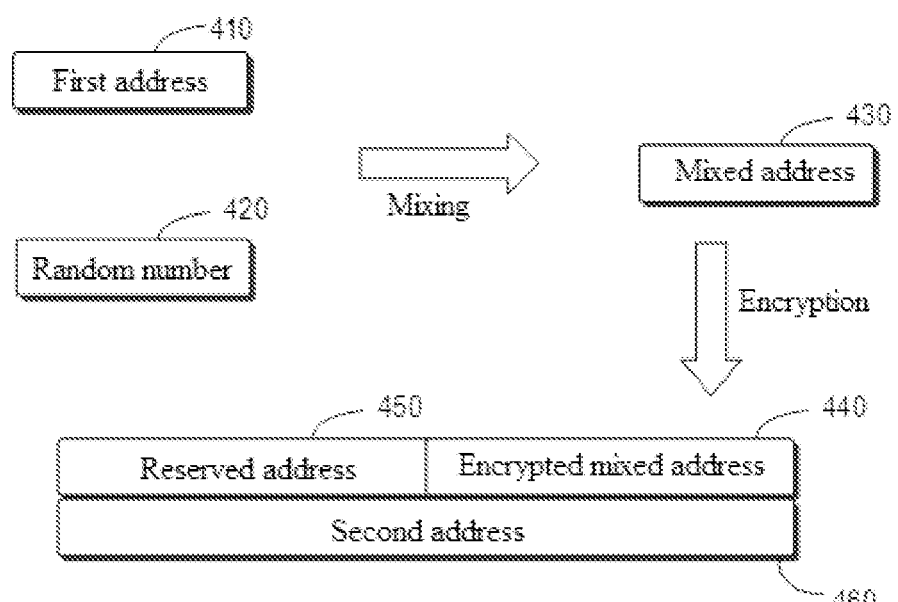
FIG. 3 schematically illustrates a schematic diagram of a structure of a second address according to an example implementation of the present disclosure.
FIG. 4 schematically illustrates a schematic diagram of a process for encrypting a second address according to an example implementation of the present disclosure.

FIG. 3 schematically illustrates a schematic diagram of a structure of a second address according to an example implementation of the present disclosure. It can be seen that, as an example, the second address may have 128 bits, wherein the first 64 bits are used as prefix field 310, and the last 64 bits are used as interface identifier field 320.

In some embodiments, the encrypted mixed address is stored in the interface identifier field 320. As an example, the 64-bit encrypted mixed address generated at block 206 may be stored in the interface identifier field 320.

FIG. 4 schematically illustrates a schematic diagram of a process for encrypting a second address according to an example implementation of the present disclosure.

In some embodiments, first address 410 is mixed with random number 420 to obtain mixed address 430, and mixed address 430 is encrypted to obtain encrypted mixed address 440. Encrypted mixed address 440 is stored in interface identifier field 320.

In some embodiments, the address of the source device in a network accessed by the source device can be assigned by the network, which is referred to as reserved address 450. The source device may also determine its own address in the network and notify the server. The network is a trust network to which the source device already has access. Reserved address 450 may be a prefix address of a unicast address determined according to an address format based on the IPv6 protocol. Reserved address 450 may be stored in prefix field 310. Reserved address 450 and encrypted mixed address 440 are collectively referred to as second address 460.

By performing method 200, the source device may not be exposed to the network, thus increasing the security. Since only the address is encrypted, there is no need to encrypt the entire packet, thus reducing the overhead of computing resources.

In some embodiments, the first address may be replaced with the second address to generate an encrypted packet. Since the second address at this moment includes the encrypted mixed address, after the first address is replaced with the second address, the effect of encrypting the packet is achieved. Therefore, the computational overhead is reduced since there is no need to encrypt the packet. After the encrypted packet is generated, the encrypted packet may be sent to a target device.

Figure 5A:
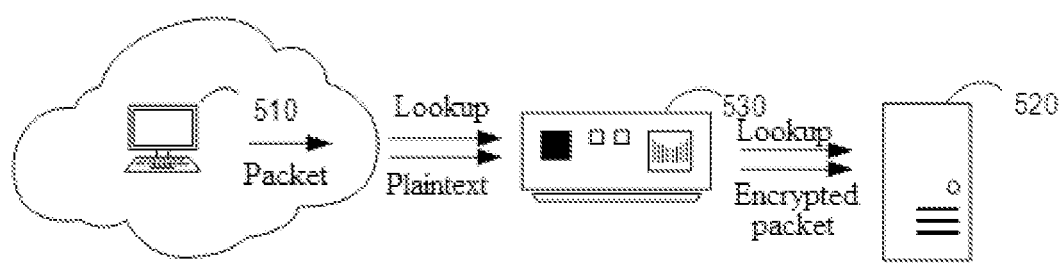
FIG. 5A schematically illustrates a schematic diagram of receiving an encrypted packet according to an example implementation of the present disclosure.

FIG. 5A schematically illustrates a schematic diagram of receiving an encrypted packet according to an example implementation of the present disclosure.

As shown in FIG. 5A, in some embodiments, an encrypted packet may be received from target device 520 (via switch 530). Since the encrypted packet is different from the above-mentioned first encrypted packet, the encrypted packet is referred to as a second encrypted packet. At this moment, the address of source device 510 may be obtained based on decryption information so as to send the packet to source device 510.

Figure 5B:
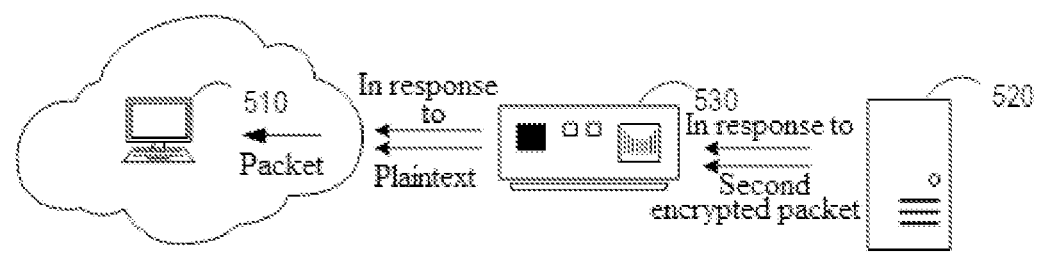
FIG. 5B schematically illustrates a schematic diagram of distribution of encryption and decryption information according to an example implementation of the present disclosure.
Figure 5C:
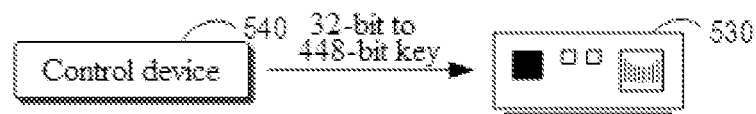
FIG. 5C schematically illustrates a schematic diagram of obtaining a key from a control device according to an example implementation of the present disclosure.

FIG. 5B schematically illustrates a schematic diagram of distribution of encryption and decryption information according to an example implementation of the present disclosure. FIG. 5C schematically illustrates a schematic diagram of obtaining a key from a control device according to an example implementation of the present disclosure. The decryption process is described below with reference to FIG. 5B and FIG. 5C.

In some embodiments, decryption information about a decryption operation may be obtained from control device 540, as illustrated in FIG. 5C. The advantage is that even if the decryption information (such as a decryption key) has been updated, the updated decryption information may be obtained in time. After the decryption information is obtained, the second encrypted packet is decrypted to generate a decrypted packet. This process may be understood as a reverse process of the encryption process.

As shown in the figure, in some embodiments, source device 510 is a client terminal device in a local area network, and target device 520 is a DNS domain name server in the Internet. In addition to the DNS server, it may also be extended to cloud servers, NTP servers, VPN servers, etc. in the Internet.

In some embodiments, method 200 is performed at switch 530 (for example, by a computing resource in the switch), and switch 530 is arranged between the local area network and the Internet. By encrypting the first address at the switch, the DNS server can be prevented from acquiring the real address of the source device. In this way, the address of the source device is not exposed to the network, but the source device may send a plaintext to the network, thereby protecting the privacy of the source device without increasing the burden on the source device. Therefore, for the source device, the network environment is more secure.

Figure 6A:
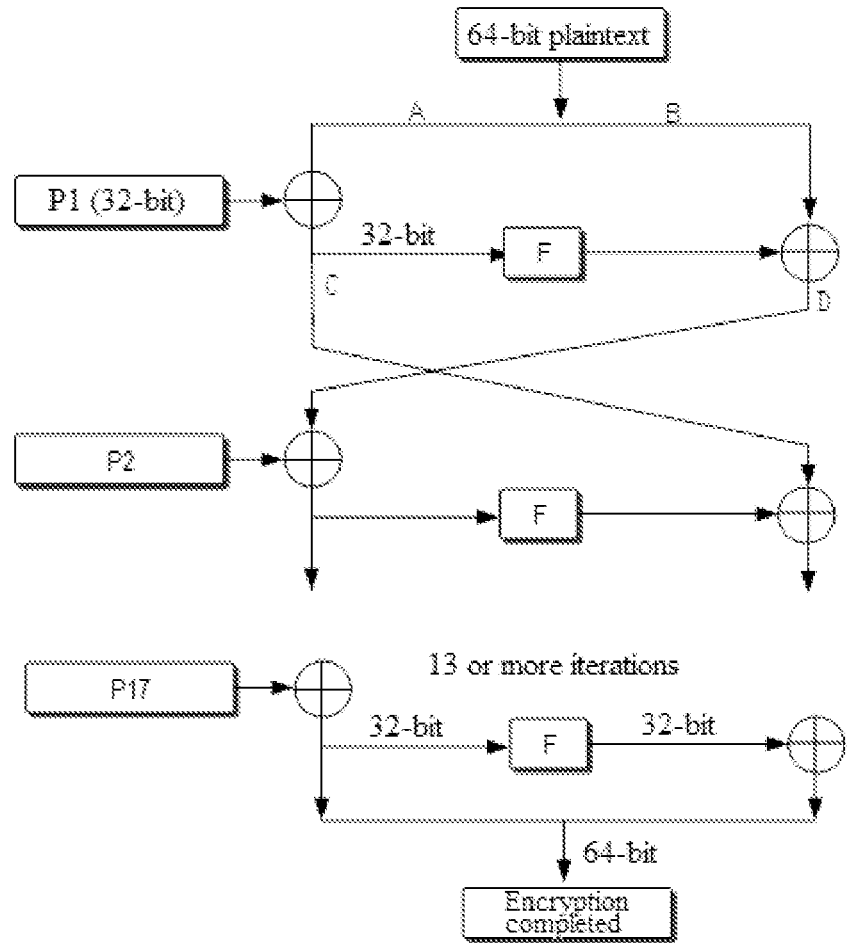
FIG. 6A schematically illustrates a schematic diagram of an encryption model according to an example implementation of the present disclosure.

FIG. 6A schematically illustrates a schematic diagram of an encryption model according to an example implementation of the present disclosure.

First, a 64-bit mixed address is divided into two 32-bit sequences A and B, the sequence A is added to a sequence in the P box, and then an F operation is performed on the obtained sum (sequence C) (the meaning of the F operation will be described in detail with reference to FIG. 6B). Then, the result of the F operation is added to the other 32-bit sequence B to obtain a sequence D. The above operations are repeated for the sequences C and D, and after at least 13 iterations, the last two 32-bit sequences are spliced to obtain a 64-bit sequence, that is, an encrypted result.

Figure 6B:
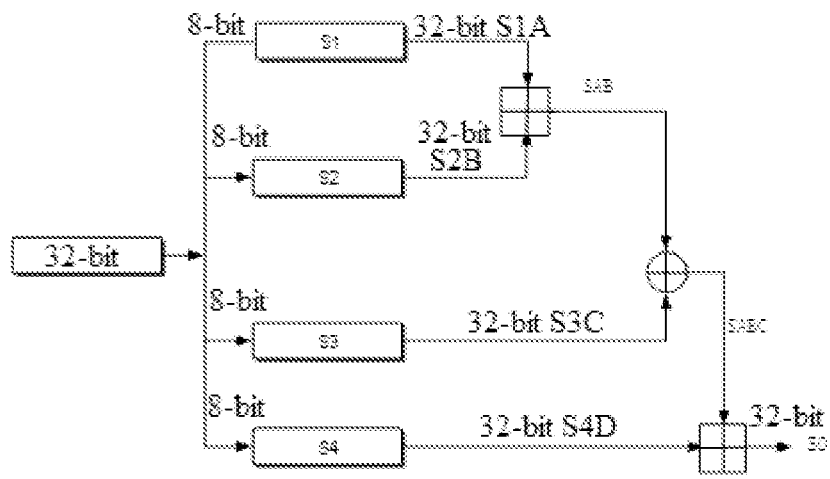
FIG. 6B schematically illustrates a schematic diagram of an F operation of the encryption model according to an example implementation of the present disclosure.

FIG. 6B schematically illustrates a schematic diagram of an F operation of the encryption model according to an example implementation of the present disclosure.

As shown in FIG. 6B, in the F operation, the 32-bit sequence is first split to obtain 4 8-bit sequences. The sequences are respectively mixed with respective S boxes (S1 to S4) to obtain 32-bit sequences S1A, S2B, S3C, and S4D. S1A and S2B are encrypted to obtain SAB, and SAB and S3C are encrypted to obtain SABC. S4D and SABC are encrypted to obtain a final output result SO.

Such an encryption technique is more suitable for a lightweight encryption process. It may achieve an encryption effect without consuming too much computing power and time, and therefore conserves computing resources, for example, at switches. Moreover, the number of bits of the key is relatively flexible and may be changed at any time. Other encryption techniques may also be used, which are not limited in the present disclosure.

Figure 7:
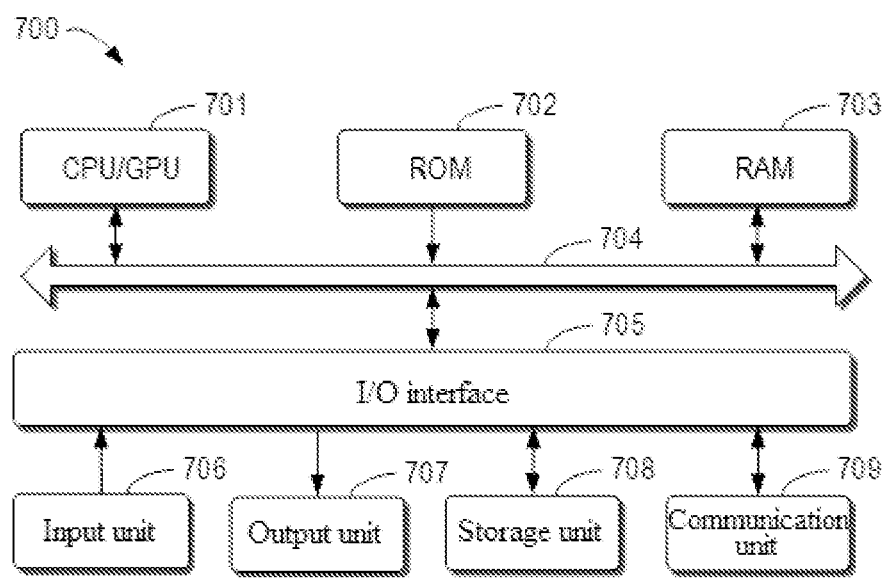
FIG. 7 schematically illustrates a block diagram of a device for encrypting an address according to an example implementation of the present disclosure.

FIG. 7 illustrates a schematic block diagram of device 700 that may be used to implement embodiments of the present disclosure. Device 700 may be a device or apparatus as described in embodiments of the present disclosure. As shown FIG. 7, device 700 includes central processing unit (CPU) 701, which may execute various appropriate actions and processing in accordance with computer program instructions stored in read-only memory (ROM) 702 or computer program instructions loaded from storage unit 708 onto random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704. Although not shown in FIG. 7, device 700 may also include a co-processor.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various methods or processes described above may be performed by CPU 701. For example, in some embodiments, the method 200 may be implemented as a computer software program that is tangibly included in a machine-readable medium, such as storage unit 708. In some embodiments, part or all of the computer program may be loaded and/or installed onto device 700 via ROM 702 and/or communication unit 709. When the computer program is loaded into RAM 703 and executed by CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed in parallel substantially, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed herein.

Some example implementations of the present disclosure are listed below.

In a first aspect of the present disclosure, a method for encrypting an address is provided. The method includes: in response to receiving a packet from a source device, extracting a first address representing an address of the source device from the packet. The method further includes: mixing the first address with a random number to generate a mixed address, wherein the number of bits of the first address is the same as the number of bits of the random number. The method further includes: encrypting the mixed address. Moreover, the method further includes: generating a second address representing the address of the source device at least partially based on the encrypted mixed address, wherein the second address includes a prefix field and an interface identifier field.

In some embodiments, generating a second address representing the address of the source device includes: storing the encrypted mixed address in the interface identifier field.

In some embodiments, generating a second address representing the address of the source device further includes: determining a reserved address of the second address according to a trust network of the source device, wherein the reserved address includes a prefix address of a unicast address determined according to an IPv6 address format; and storing the reserved address in the prefix field.

In some embodiments, encrypting the mixed address includes: obtaining encryption information about an encryption operation; dividing the mixed address into a plurality of blocks; encrypting each of the plurality of blocks based on the encryption information to determine corresponding encrypted blocks; and combining the corresponding encrypted blocks to generate the encrypted mixed address.

In some embodiments, the method further includes: replacing the first address with the second address to generate an encrypted packet; and sending the encrypted packet to a target device.

In some embodiments, the method further includes: receiving a second encrypted packet from the target device; and obtaining the first address of the source device based on the decryption of the second encrypted packet.

In some embodiments, the decryption of the second encrypted packet includes: obtaining decryption information about a decryption operation; decrypting the second encrypted packet based on the decryption information to generate a decrypted packet; and sending the decrypted packet to the source device.

In some embodiments, the source device is a client terminal device in a local area network, and the target device is a domain name server in the Internet.

In some embodiments, the method is performed at a switch, and the switch is arranged between the local area network and the Internet.

In a second aspect of the present disclosure, an electronic device is provided. The electronic device includes a processor and a memory coupled to the processor. The memory has instructions stored therein which, when executed by the processor, cause the device to perform actions. The actions include: in response to receiving a packet from a source device, extracting a first address representing an address of the source device from the packet. The actions further include: mixing the first address with a random number to generate a mixed address, wherein the number of bits of the first address is the same as the number of bits of the random number. The actions further include: encrypting the mixed address. Moreover, the actions further include: generating a second address representing the address of the source device at least partially based on the encrypted mixed address, wherein the second address includes a prefix field and an interface identifier field.

In some embodiments, generating a second address representing the address of the source device includes: storing the encrypted mixed address in the interface identifier field.

In some embodiments, generating a second address representing the address of the source device further includes: determining a reserved address of the second address according to a trust network of the source device, wherein the reserved address includes a prefix address of a unicast address determined according to an IPv6 address format; and storing the reserved address in the prefix field.

In some embodiments, encrypting the mixed address includes: obtaining encryption information about an encryption operation; dividing the mixed address into a plurality of blocks; encrypting each of the plurality of blocks based on the encryption information to determine corresponding encrypted blocks; and combining the corresponding encrypted blocks to generate the encrypted mixed address.

In some embodiments, the actions further include: replacing the first address with the second address to generate an encrypted packet; and sending the encrypted packet to a target device.

In some embodiments, the actions further include: receiving a second encrypted packet from the target device; and obtaining the first address of the source device based on the decryption of the second encrypted packet.

In some embodiments, the decryption of the second encrypted packet includes: obtaining decryption information about a decryption operation; decrypting the second encrypted packet based on the decryption information to generate a decrypted packet; and sending the decrypted packet to the source device.

In some embodiments, the source device is a client terminal device in a local area network, and the target device is a domain name server in the Internet.

In some embodiments, the electronic device is a switch, and the switch is arranged between the local area network and the Internet.

In an embodiment of the third aspect, a computer program product is provided. The computer program product is tangibly stored on a computer-readable medium and includes computer-executable instructions that, when executed by a device, cause the device to perform the method of the first aspect.

Although the present disclosure has been described using language specific to structural features and/or method logical actions, it should be understood that the subject matter defined in the appended claims is not necessarily limited to the specific features or actions described above. Rather, the specific features and actions described above are merely example forms of implementing the claims.

What is claimed is:

1. A method for encrypting an address, comprising:

in response to receiving a first packet from a source device in a switch arranged between the source device and at least one server, extracting in the switch a first address representing an address of the source device from the first packet, the first packet being part of an ongoing communication process carried out between the source device and the at least one server, the communication process utilizing a data exchange service provided by the switch;

for the first packet, mixing the first address with a random number in the switch to generate a mixed address, wherein the number of bits of the first address is the same as the number of bits of the random number, and the number of bits of the mixed address is twice the number of bits of the random number;

for the first packet, encrypting the mixed address in the switch, utilizing different look-up tables of respective different types, stored in one or more memories of the switch, to encrypt different portions of the mixed address, wherein a length of a key utilized in the encrypting of the mixed address is determined by a control device separate from the switch; and for the first packet, generating, in the switch, a second address representing the address of the source device at least partially based on the encrypted mixed address, wherein the second address comprises a prefix field and an interface identifier field;

wherein the extracting, mixing, encrypting and generating are repeated in the switch for each of one or more additional packets received in the switch from the same source device having the same first address, the one or more additional packets each being part of the ongoing communication process carried out between the source device and the at least one server utilizing the data exchange service provided by the switch; and wherein for the first and additional packets received from the same source device having the same first address, respective instances of the extracting, mixing, encrypting and generating utilize respective random numbers in the mixing to generate respective mixed addresses for the respective first and additional packets.

2. The method according to claim 1, wherein generating a second address representing the address of the source device comprises:

storing the encrypted mixed address in the interface identifier field.

3. The method according to claim 2, wherein generating a second address representing the address of the source device further comprises:

determining a reserved address of the second address according to a trust network of the source device, wherein the reserved address comprises a prefix address of a unicast address determined according to an IPV6 address format; and storing the reserved address in the prefix field.

4. The method according to claim 1, wherein encrypting the mixed address comprises:

obtaining encryption information about an encryption operation;

dividing the mixed address into a plurality of blocks;

encrypting each of the plurality of blocks based on the encryption information to determine corresponding encrypted blocks; and combining the corresponding encrypted blocks to generate the encrypted mixed address.

5. The method according to claim 1, further comprising:

replacing the first address with the second address to generate an encrypted packet; and sending the encrypted packet to a target device.

6. The method according to claim 5, further comprising:

receiving a second encrypted packet from the target device; and obtaining the first address of the source device based on decryption of the second encrypted packet.

7. The method according to claim 6, wherein the decryption of the second encrypted packet comprises:

obtaining decryption information about a decryption operation;

decrypting the second encrypted packet based on the decryption information to generate a decrypted packet; and sending the decrypted packet to the source device.

8. The method according to claim 5, wherein the source device is a client terminal device in a local area network, and the target device is a domain name server in the Internet.

9. The method according to claim 8, wherein the switch is arranged between the local area network and the Internet.

10. An electronic device, comprising:

at least one processor; and memory coupled to the at least one processor, wherein the memory has instructions stored therein, and the instructions, when executed by the at least one processor, cause the electronic device to execute actions comprising:

in response to receiving a first packet from a source device in a switch arranged between the source device and at least one server, extracting in the switch a first address representing an address of the source device from the first packet, the first packet being part of an ongoing communication process carried out between the source device and the at least one server, the communication process utilizing a data exchange service provided by the switch;

for the first packet, mixing the first address with a random number in the switch to generate a mixed address, wherein the number of bits of the first address is the same as the number of bits of the random number, and the number of bits of the mixed address is twice the number of bits of the random number;

for the first packet, encrypting the mixed address in the switch, utilizing different look-up tables of respective different types, stored in one or more memories of the switch, to encrypt different portions of the mixed address, wherein a length of a key utilized in the encrypting of the mixed address is determined by a control device separate from the switch; and for the first packet, generating, in the switch, a second address representing the address of the source device at least partially based on the encrypted mixed address, wherein the second address comprises a prefix field and an interface identifier field;

wherein the extracting, mixing, encrypting and generating are repeated in the switch for each of one or more additional packets received in the switch from the same source device having the same first address, the one or more additional packets each being part of the ongoing communication process carried out between the source device and the at least one server utilizing the data exchange service provided by the switch; and wherein for the first and additional packets received from the same source device having the same first address, respective instances of the extracting, mixing, encrypting and generating utilize respective random numbers in the mixing to generate respective mixed addresses for the respective first and additional packets.

11. The electronic device according to claim 10, wherein generating a second address representing the address of the source device comprises:
   storing the encrypted mixed address in the interface identifier field.

12. The electronic device according to claim 11, wherein generating a second address representing the address of the source device further comprises:
   determining a reserved address of the second address according to a trust network of the source device, wherein the reserved address comprises a prefix address of a unicast address determined according to an IPV6 address format; and
   storing the reserved address in the prefix field.

13. The electronic device according to claim 10, wherein encrypting the mixed address comprises:
   obtaining encryption information about an encryption operation;
   dividing the mixed address into a plurality of blocks;
   encrypting each of the plurality of blocks based on the encryption information to determine corresponding encrypted blocks; and
   combining the corresponding encrypted blocks to generate the encrypted mixed address.

14. The electronic device according to claim 10, wherein the actions further comprise:
   replacing the first address with the second address to generate an encrypted packet; and
   sending the encrypted packet to a target device.

15. The electronic device according to claim 14, wherein the actions further comprise:
   receiving a second encrypted packet from the target device; and
   obtaining the first address of the source device based on decryption of the second encrypted packet.

16. The electronic device according to claim 15, wherein the decryption of the second encrypted packet comprises:
   obtaining decryption information about a decryption operation;
   decrypting the second encrypted packet based on the decryption information to generate a decrypted packet; and
   sending the decrypted packet to the source device.

17. The electronic device according to claim 14, wherein the source device is a client terminal device in a local area network, and the target device is a domain name server in the Internet.

18. The electronic device according to claim 17, wherein the switch is arranged between the local area network and the Internet.

19. A computer program product tangibly stored on a non-transitory computer-readable medium and including machine-executable instructions that, when executed by a machine, cause the machine to perform actions comprising:
   in response to receiving a first packet from a source device in a switch arranged between the source device and at least one server, extracting in the switch a first address representing an address of the source device from the first packet, the first packet being part of an ongoing communication process carried out between the source device and the at least one server, the communication process utilizing a data exchange service provided by the switch;
   for the first packet, mixing the first address with a random number in the switch to generate a mixed address, wherein the number of bits of the first address is the same as the number of bits of the random number, and the number of bits of the mixed address is twice the number of bits of the random number;
   for the first packet, encrypting the mixed address in the switch, utilizing different look-up tables of respective different types, stored in one or more memories of the switch, to encrypt different portions of the mixed address, wherein a length of a key utilized in the encrypting of the mixed address is determined by a control device separate from the switch; and
   for the first packet, generating, in the switch, a second address representing the address of the source device at least partially based on the encrypted mixed address, wherein the second address comprises a prefix field and an interface identifier field;
   wherein the extracting, mixing, encrypting and generating are repeated in the switch for each of one or more additional packets received in the switch from the same source device having the same first address, the one or more additional packets each being part of the ongoing communication process carried out between the source device and the at least one server utilizing the data exchange service provided by the switch; and
   wherein for the first and additional packets received from the same source device having the same first address, respective instances of the extracting, mixing, encrypting and generating utilize respective random numbers in the mixing to generate respective mixed addresses for the respective first and additional packets.

20. The computer program product according to claim 19, wherein generating a second address representing the address of the source device comprises:
   storing the encrypted mixed address in the interface identifier field.

* * * * *